(12) United States Patent
Maeda et al.

(10) Patent No.: US 8,065,896 B2
(45) Date of Patent: Nov. 29, 2011

(54) STEERING APPARATUS

(75) Inventors: Toshinobu Maeda, Okazaki (JP);
Atsushi Tano, Sakurai (JP)

(73) Assignee: JTEKT Corporation, Osaka-shi (JP)

( * ) Notice: Subject to any disclaimer, the term of this patent is extended or adjusted under 35 U.S.C. 154(b) by 182 days.

(21) Appl. No.: 12/585,738

(22) Filed: Sep. 23, 2009

(65) Prior Publication Data

US 2010/0077808 A1 Apr. 1, 2010

(30) Foreign Application Priority Data

Sep. 30, 2008 (JP) ................................. 2008-253082
Aug. 5, 2009 (JP) ................................. 2009-182534

(51) Int. Cl.
*B60R 25/02* (2006.01)
*F16C 3/00* (2006.01)
*G05G 5/00* (2006.01)

(52) U.S. Cl. ................ 70/186; 70/182; 70/183; 70/184; 70/185; 70/252; 180/287; 280/771

(58) Field of Classification Search ................ 70/184, 70/182, 183, 186, 185, 252; 180/443
See application file for complete search history.

(56) References Cited

U.S. PATENT DOCUMENTS

| | | | | |
|---|---|---|---|---|
| 4,222,246 A | * | 9/1980 | Rongley | 464/30 |
| 4,854,141 A | * | 8/1989 | Haldric et al. | 70/182 |
| 5,718,131 A | * | 2/1998 | Bobbitt, III | 70/184 |
| 5,971,094 A | * | 10/1999 | Joshita | 180/444 |
| 6,094,951 A | * | 8/2000 | Cusati | 70/184 |
| 7,658,677 B2 | * | 2/2010 | Needes et al. | 464/30 |
| 2005/0092044 A1 | | 5/2005 | Chartrain et al. | |
| 2006/0272370 A1 | * | 12/2006 | Yamada et al. | 70/186 |

FOREIGN PATENT DOCUMENTS

| | | | |
|---|---|---|---|
| EP | 0657340 A1 | * | 6/1995 |
| JP | A-2000-318626 | | 11/2000 |
| JP | B2-3453909 | | 7/2003 |
| JP | A-2006-335165 | | 12/2006 |

OTHER PUBLICATIONS

European Search Report issued in European Patent Application No. EP 09 17 1661, on Jan. 20, 2010.
European Search Report issued in European Patent Application No. 09 17 1661, on Jan. 13, 2010.

* cited by examiner

*Primary Examiner* — Lloyd Gall
*Assistant Examiner* — David E Sosnowski
(74) *Attorney, Agent, or Firm* — Oliff & Berridge, PLC

(57) ABSTRACT

A key ring according to embodiments is press-fitted onto a steering shaft (column shaft) at a position that is radially outer side of a fit portion at which multiple shaft members that constitute the steering shaft (column shaft) are fitted to each other, and that is substantially the same as the position of the key ring in the axial direction. When a lock bar is inserted into a lock bar insertion portion formed in an outer periphery of the key ring, the key ring restricts rotation of the steering shaft.

9 Claims, 4 Drawing Sheets

STEERING APPARATUS

INCORPORATION BY REFERENCE

The disclosures of Japanese Patent Applications No. 2008-253082 filed on Sep. 30, 2008 and No. 2009-182534 filed on Aug. 5, 2009 each including the specification, drawings and abstract are incorporated herein by reference in their entireties.

BACKGROUND OF THE INVENTION

1. Field of the Invention

The invention relates to a steering apparatus that includes a key ring that forms a lock mechanism that restricts the rotation of a steering shaft.

2. Description of the Related Art

A lock mechanism (steering lock mechanism) is usually provided in a steering apparatus for a vehicle, as a theft-prevention measure. The lock mechanism restricts the rotation of a steering shaft, when a power source, for example, an engine is at a standstill because a switch, for example, an ignition key, an ignition knob or a push button, is off.

In this type of lock mechanism, generally, when a lock bar is inserted into a key ring that is press-fitted onto the outer periphery of a steering shaft to which a steering torque is transmitted, the rotation of the key ring is prohibited. Because the rotation of the key ring is prohibited, the lock mechanism restricts the rotation of the steering shaft using a friction force at a press-fit portion. If a steering torque that exceeds the friction force is input in the steering shaft, the steering shaft slides with respect to the key ring. The lock mechanism allows the steering shaft to rotate at a sliding torque that corresponds to the friction force and that is generated when the steering shaft slides with respect to the key ring. Therefore, it is possible to prevent damage to the lock mechanism.

In many cases, hollow shafts are used as steering shafts for reduction in weight. However, the rigidity of a hollow shaft is low. Therefore, the hollow shaft may be slightly deformed when a key ring is press-fitted onto the hollow shaft. Accordingly, if the hollow shaft on which the key ring is press-fitted is used as a steering shaft, there is a possibility that the sliding torque is not stable.

Japanese Patent Application Publication No. 2006-335165 (JP-A-2006-335165) describes an art in which a quenching process is performed on a portion of a hollow steering shaft, on which the key ring is press-fitted (and a press-fit portion of the key ring). According to this related art, the rigidity of the portion of the hollow shaft, on which the key ring is press-fitted, is increased.

SUMMARY OF THE INVENTION

An aspect of the invention relates to a steering apparatus that includes: a steering shaft that transmits a steering torque and that is formed by connecting multiple shaft members to each other; and a key ring that is press-fitted onto the steering shaft and that has a lock bar insertion portion formed in an outer periphery of the key ring. When a lock bar is inserted into the lock bar insertion portion, the key ring restricts rotation of the steering shaft using a friction force that is generated at a press-fit portion that faces the steering shaft. When the steering torque input in the steering shaft exceeds the friction force, the steering shaft slides with respect to the key ring and the steering shaft is allowed to rotate at a sliding torque that is generated when the steering shaft slides with respect to the key ring and that corresponds to the friction force. The key ring is press-fitted onto the steering shaft at a portion at which the shaft members are fitted to each other and is arranged on a radially outer side thereof.

The simple configuration according to the aspect provides a high rigidity to the portion of the steering shaft on which the key ring is press-fitted. As a result, it is possible to generate a stable sliding torque.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereafter, embodiments of the invention will be described with reference to the accompanying drawings.

Figure 1:
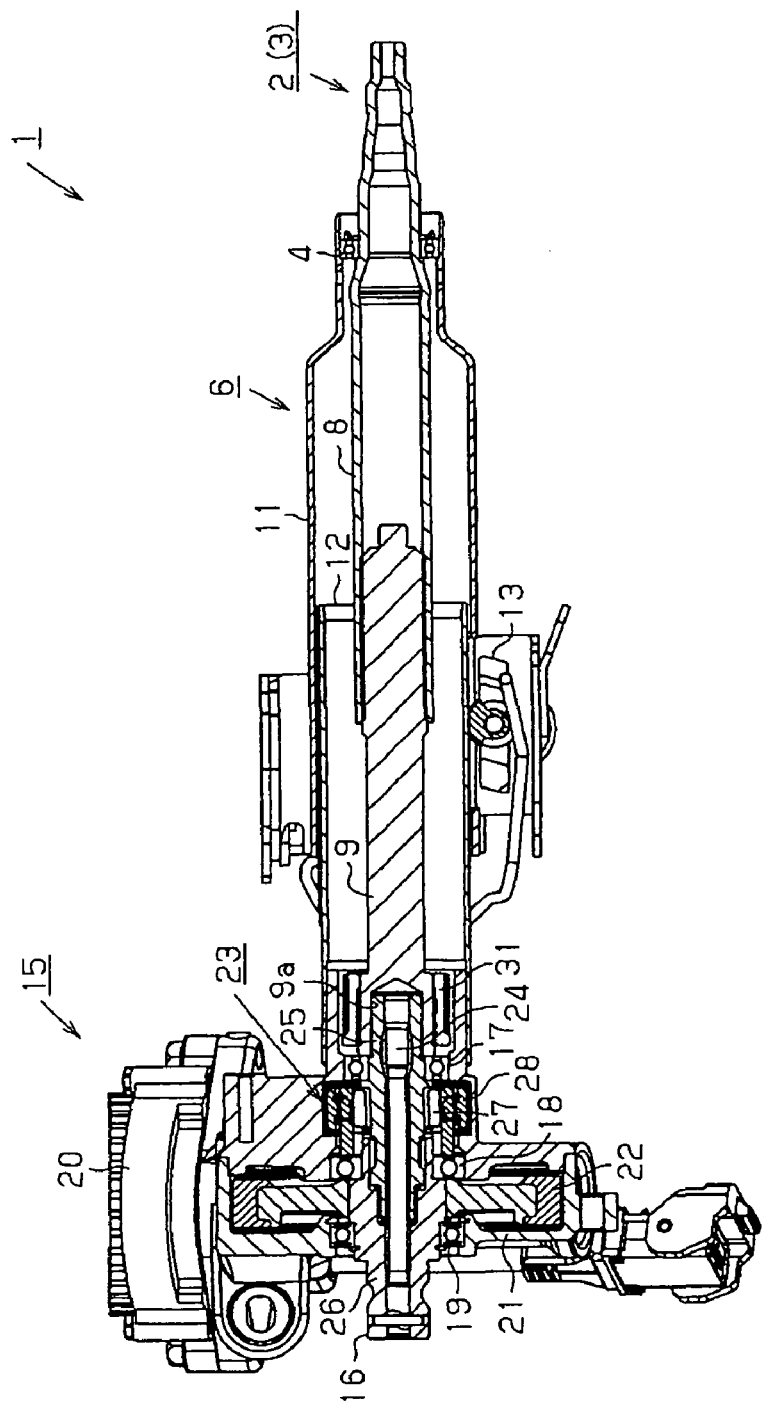
FIG. 1 is a cross-sectional view showing a steering column and portions near the steering column in a steering apparatus according to a first embodiment of the invention.
Figure 2:
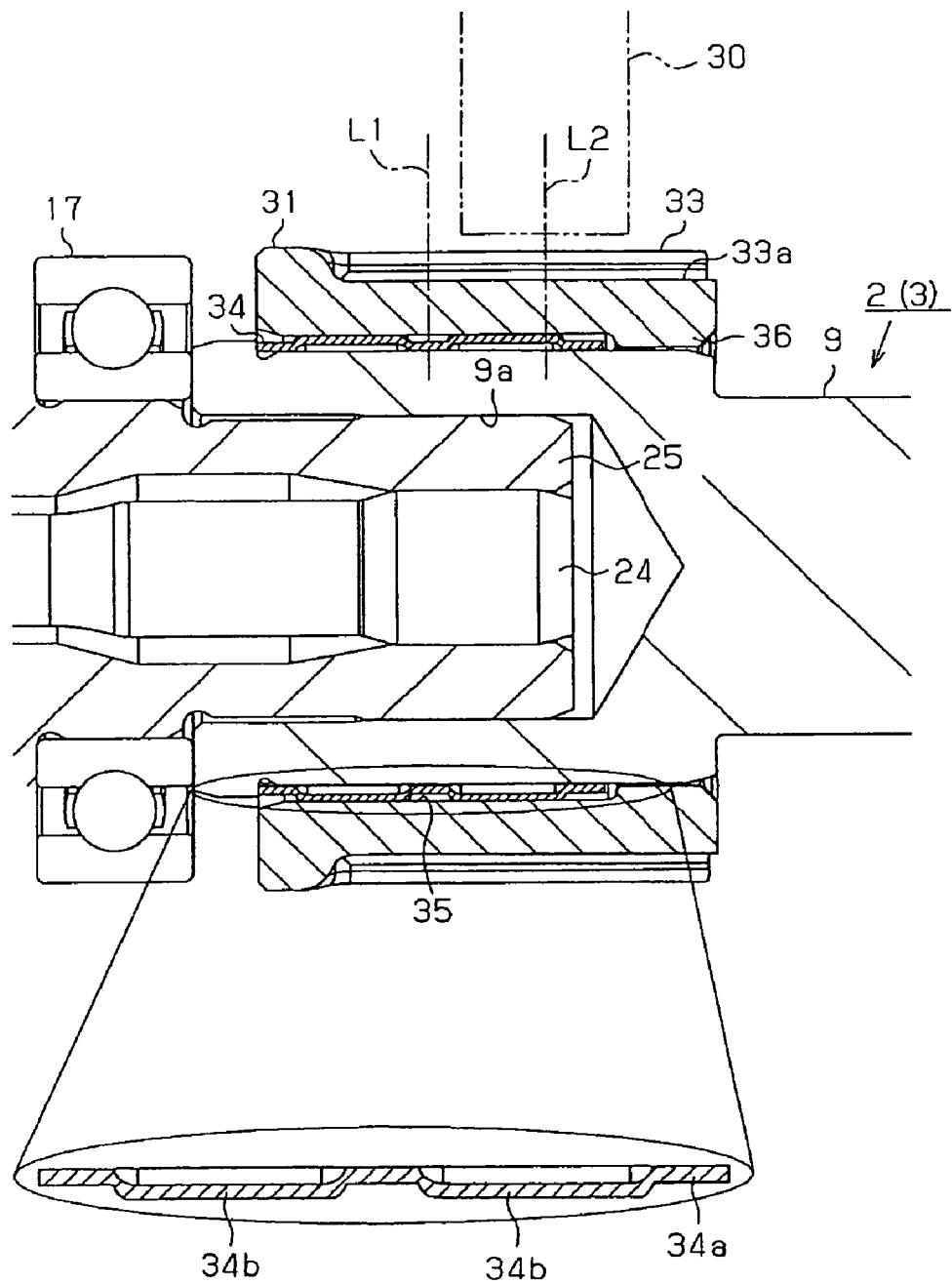
FIG. 2 is an enlarged cross-sectional view showing a key ring and portions near the key ring in FIG. 1.

FIG. 1 is a cross-sectional view showing a steering column and portions near the steering column in a steering apparatus 1 according to a first embodiment. FIG. 2 is an enlarged view showing a key ring and portions near the key ring in FIG. 1. As shown in FIG. 1, a steering wheel (not shown) is fixed to a first end portion (right end portion in FIG. 1) of a column shaft 3, and the column shaft 3 is an input-end portion of a steering shaft 2. The column shaft 3 is supported by bearings 4, 17, 18 and 19 so that the column shaft 3 is rotatably housed in a steering column 6. A second end portion (left end portion in FIG. 1) of the column shaft 3 is connected to an intermediate shaft (not shown) and a steering mechanism (not shown) that includes, for example, a steering gear (rack-and-pinion mechanism) via a universal joint. Therefore, the rotation and the steering torque caused by a steering operation performed by a driver are transmitted to the steering mechanism to change the steering angle of steered wheels (not shown).

The steering apparatus 1 according to the first embodiment has a telescoping function of adjusting the position of the steering wheel in the axial direction of the column shaft 3. More specifically, the column shaft 3 in the first embodiment includes a hollow first shaft 8 that forms a steering wheel-side end portion of the column shaft 3 when the steering wheel is fixed to the column shaft 3, and a second shaft 9 that is splined to the first shaft 8. When the second shaft 9 is splined to the first shaft 8, the first shaft 8 is allowed to slide in the axial direction. The steering column 6 includes an outer tube 11 that houses the first shaft 8 and supports the first shaft 8 via the bearing 4, and an inner tube 12 that houses the second shaft 9. When the inner tube 12 is fitted in the outer tube 11 so that the inner tube 12 contacts the inner periphery of the outer tube 11, the outer tube 11 is allowed to slide with respect to the inner tube 12 in the axial direction. A telescoping unit 13 is mounted on the outer periphery of the outer tube 11 in such a manner that the outer tube 11 and the first shaft 8 are allowed to move relative to the inner tube 12 and the second shaft 9.

Therefore, the telescoping unit 13 is able to adjust the position of the steering wheel in the axial direction.

The steering column 6 in the first embodiment is tiltably supported by a link mechanism (not shown). The link mechanism serves a tilting function of adjusting the position of the steering wheel in the up-and-down direction by tilting the column shaft 3 together with the steering column 6.

The steering apparatus 1 according to the first embodiment is a column-assist electric power steering system (EPS). The column shaft 3 in the first embodiment includes the first shaft 8, the second shaft 9, a third shaft 25, and a fourth shaft 26. The steering wheel is fixed to a first end portion 8 of the first shaft. A first end portion (right end portion in FIG. 1) of the second shaft 9 is splined to the first shaft 8. A first end (right end portion in FIG. 1) of the third shaft 25 is fitted in and splined to a second end portion of the second shaft 9. The fourth shaft 26 is an output shaft 16 of an EPS actuator 15, and connected to the third shaft 25 via a torsion bar 24.

More specifically, because the output shaft 16 is supported by the bearings 18 and 19, the output shaft 16 is rotatably housed in a housing 21 of the EPS actuator 15. Because the third shaft 25 is supported by the bearing 17, the third shaft 25 is rotatably housed in the housing 21 of the EPS actuator 15. The output shaft 16 and the third shaft 25 are connected to each other via the torsion bar 24 that passes through center holes of the output shaft 16 and the third shaft 25 so that the output shaft 16 and the third shaft 25 are rotatable relative to each other. When the steering wheel-side end portion (right end portion in FIG. 1) of the third shaft 25 is fitted in and splined to a hollow spline-fit portion 9*a* that is formed in the second shaft 9 at an end portion distal to the steering wheel, the second shaft 9 is connected to the third shaft 25 and torque is transmitted therebetween. When the second shaft 9 is connected to the third shaft 25 in the above-described manner, the second shaft 9 is rotatably housed in the inner tube 12 and extends in the inner tube 12 from the housing 21 of the EPS actuator 15.

A wheel gear 22 is fixed to the outer periphery of the output shaft 16. The EPS actuator 15 in the first embodiment reduces the speed of rotation of the motor 20 using a speed reduction mechanism formed of the wheel gear 22 and a worm gear (not shown) and transmits the rotation having a reduced speed to the output shaft 16, thereby applying an assist force to the steering shaft 2.

In the EPS actuator 15 in the first embodiment, a torque sensor 23 that detects a steering torque transmitted via the steering shaft 2 (column shaft 3) is embedded.

More specifically, the output shaft 16 of the EPS actuator 15 is the fourth shaft 26 provided with the wheel gear 22, and is connected to the third shaft 25 via the torsion bar 24. More specifically, the third shaft 25 and the fourth shaft 26 are both hollow, and the torsion bar 24 is fitted in the hollow portions of the third shaft 25 and the fourth shaft 26. The third shaft 25 and the fourth shaft 26 are rotatably supported by the housing 21 of the EPS actuator 15 via the bearing 17 and the bearings 18 and 19, respectively. End portions of the torsion bar 24 are fixed to the end portion of the third shaft 25 and the end portion of the fourth shaft 26. More specifically, a first end portion of the torsion bar 24 is fixed to the inner periphery of the steering wheel-side end portion (right end portion in FIG. 1) of the third shaft 25, and a second end portion of the torsion bar 24 is fixed to the inner periphery of the fourth shaft 26 at an end portion distal to the steering wheel (left end portion in FIG. 1).

A magnet 27 is fixed to the outer periphery of the third shaft 25. A magnetic sensor (hall IC) 28 that detects a change in magnetic flux is fitted to the inner periphery of the housing 21 of the EPS actuator 15 at a position opposed to the magnet 27. The torque sensor 23 in the first embodiment detects a steering torque that is transmitted via the steering shaft 2 (column shaft 3) by detecting a torsion angle between the third shaft 25 and the fourth shaft 26, that is, the torsion of the torsion bar 24, as a change in the magnetic flux, with the use of the magnetic sensor 28.

Next, the key ring fitted to the steering shaft (column shaft) in the first embodiment will be described.

The steering apparatus 1 according to the first embodiment includes a lock mechanism (steering lock mechanism) that restricts the rotation of the steering shaft 2 when a power source, for example, an engine is at a standstill because a switch, for example, an ignition key, an ignition knob or a push button, is off. As shown in FIG. 1 and FIG. 2, the steering shaft 2 is provided with a key ring 31 that restricts the rotation of the steering shaft 2 when a lock bar 30 is inserted into the key ring 31.

More specifically, as shown in FIG. 2, the substantially cylindrical key ring 31 is press-fitted onto the outer periphery of the column shaft 3. More specifically, in the first embodiment, the key ring 31 is arranged on the radially outer side of a portion at which the second shaft 9 and the third shaft 25 that constitute the column shaft 3 are splined to each other. Further, the key ring 31 is arranged at substantially the same position as the portion, at which the second shaft 9 and the third shaft 25 are splined to each other, in the axial direction. That is, the key ring 31 is press-fitted onto the column shaft 3 at a portion that is on the radially outer side of the spline-fit portion 9*a*. At the portion of the column shaft 3 on which the key ring 31 is press-fitted, the end portion of the torsion bar 24 is fixed to the third shaft 25 so that the third shaft 25 and the torsion bar 24 do not rotate relative to each other. The portion of the column shaft 3 on which the key ring 31 is press-fitted is substantially solid because the hollow portion is filled with the torsion bar 24. Therefore, high rigidity is provided to the portion of the column shaft 3 on which the key ring 31 is press-fitted. A lock bar insertion portion 33, where multiple races 33*a* into which the lock bar 30 may be inserted are formed, is formed in the entire outer periphery of the key ring 31. That is, in the key ring 31 in the first embodiment, the lock bar insertion portion 33 is formed in a portion that is on the radially outer side of a press-fit portion at which the key ring 31 is press-fitted onto the column shaft 3.

More specifically, according to the first embodiment, the key ring 31 is press-fitted onto the column shaft 3 with a tolerance ring 34 arranged on the inner periphery of the key ring 31. The tolerance ring 34 is an annular spring member that generates a pressing force that is applied in the radial direction. The tolerance ring 34 is a spring member that includes an annular or C-shaped base portion 34*a* that extends in the axial direction, and multiple bulge portions 34*b* that are formed on the entire circumference of the base portion 34*a* and that bulge from the base portion 34 outward in the radial direction. The tolerance ring 34 has a function of stabilizing a friction force between two members between which the tolerance ring 34 is interposed.

More specifically, the key ring 31 is press-fitted onto the column shaft 3 with the tolerance ring 34 fitted on the inner periphery of one axial end portion of the key ring 31 (in the first embodiment, an end portion distal to the steering wheel (left end portion in FIG. 2)). Thus, a recess 35 that corresponds to the bulge portion 34*b* of the tolerance ring 34 is formed on the inner periphery of the key ring 31 at a portion at which the tolerance ring 34 is arranged. In the first embodiment, a flange 36 that projects inward in the radial direction is formed on the inner periphery of the key ring 31 at the other axial end portion on the opposite side of the recess 35 (in the first embodiment, the steering wheel-side end portion, that is, the right end portion in FIG. 2). That is, the flange 36 is formed on the inner periphery of the key ring 31 at the end portion on which the recess 35 is not formed.

After the key ring 31 is press-fitted onto the column shaft 3, the center position L1 of the tolerance ring 34, provided to stabilize the friction force between the key ring 31 and the column shaft 3, in the axial direction may offset from the center position L2 of the lock bar 30 in the axial direction of the column shaft 3. When the center position L1 offsets from the center position L2, if the lock bar 30 is inserted into the key ring 31, the key ring 31 and the column shaft 3 may not be coaxial with each other, that is, the key ring 31 may tilt with respect to the column shaft 3. However, according to the first embodiment, the flange 36 is provided to reduce the space between the key ring 31 and the column shaft 3 at a portion that may cause the tilting. Therefore, it is possible to prevent the key ring 31 from tilting with respect to the column shaft 3.

According to the first embodiment, in the case where a steering torque that exceeds a friction force between the key ring 31 and the column shaft 3 is input in the column shaft 3, it is possible to stabilize a torque that corresponds to the friction force and that is generated when the column shaft 3 slides with respect to the key ring 3. That is, it is possible to stabilize a sliding torque.

According to the first embodiment, the following effects are obtained.

1) The key ring 31 is press-fitted on the column shaft 3 at a position on the radially outer side of the portion at which the second shaft 9 and the third shaft 25 that constitute the steering shaft 2 (column shaft 3) are splined to each other. Further, the key ring 31 is arranged at substantially the same position as the portion, at which the second shaft 9 and the third shaft 25 are splined to each other, in the axial direction.

That is, even if the shaft members are hollow, the rigidity of a fit portion, at which the shaft members are fitted to each other, is increased. This is because the shaft members overlap each other at the fit portion. Therefore, if the simple configuration described above is employed, it is possible to provide high rigidity to the portion of the column shaft 3 on which the key ring 31 is press-fitted without performing a quenching process that may complicate the production method and may increase the production cost. As a result, it is possible to generate a more stable sliding torque.

2) At the portion of the column shaft 3 on which the key ring 31 is press-fitted, the end portion of the torsion bar 24 is fixed to the third shaft 25 so that the third shaft 25 and the torsion bar 24 do not rotate relative to each other.

Generally, a higher rigidity is provided to the portion of the steering shaft 2 to which the torsion bar 24 is fixed. The portion of the column shaft 3 on which the key ring 31 is press-fitted is substantially solid because the torsion bar 24 is fixed to the inner periphery of the end portion of the third shaft 25. Therefore, if the above-described configuration is employed, it is possible to provide a higher rigidity. As a result, it is possible to generate a more stable sliding torque.

3) In the key ring 31, the lock bar insertion portion 33 is formed in the portion that is on the radially outer side of the press-fit portion at which the key ring 31 is press-fitted onto the column shaft 3. If this configuration is employed, the length of the key ring 31 is reduced in the axial direction. Accordingly, it is possible to increase the stroke of an energy absorbing mechanism that absorbs collision energy when a vehicle collision occurs.

4) The key ring 31 is press-fitted onto the steering shaft 2 (column shaft 3) with the tolerance ring 34 arranged on the inner periphery of the key ring 31. The tolerance ring 34 is an annular spring member that generates a pressing force that is applied in the radial direction. In addition, the flange 36 that projects inward in the radial direction is formed on the inner periphery of the end portion of the key ring 31.

The center position L1 of the tolerance ring 34 in the axial direction may offset from the center position L2 of the lock bar 30 in the axial direction of the column shaft 3. When the center position L1 offsets from the center position L2, if the lock bar 30 is inserted into the key ring 31, the key ring 31 and the column shaft 3 may not be coaxial with each other, that is, the key ring 31 may tilt with respect to the column shaft 3. However, in the above-described configuration, the flange 36 is provided to reduce the space between the key ring 31 and the column shaft 3. Therefore, it is possible to prevent the key ring 31 from tilting with respect to the column shaft 3. As a result, it is possible to generate a more stable sliding torque.

Figure 3:
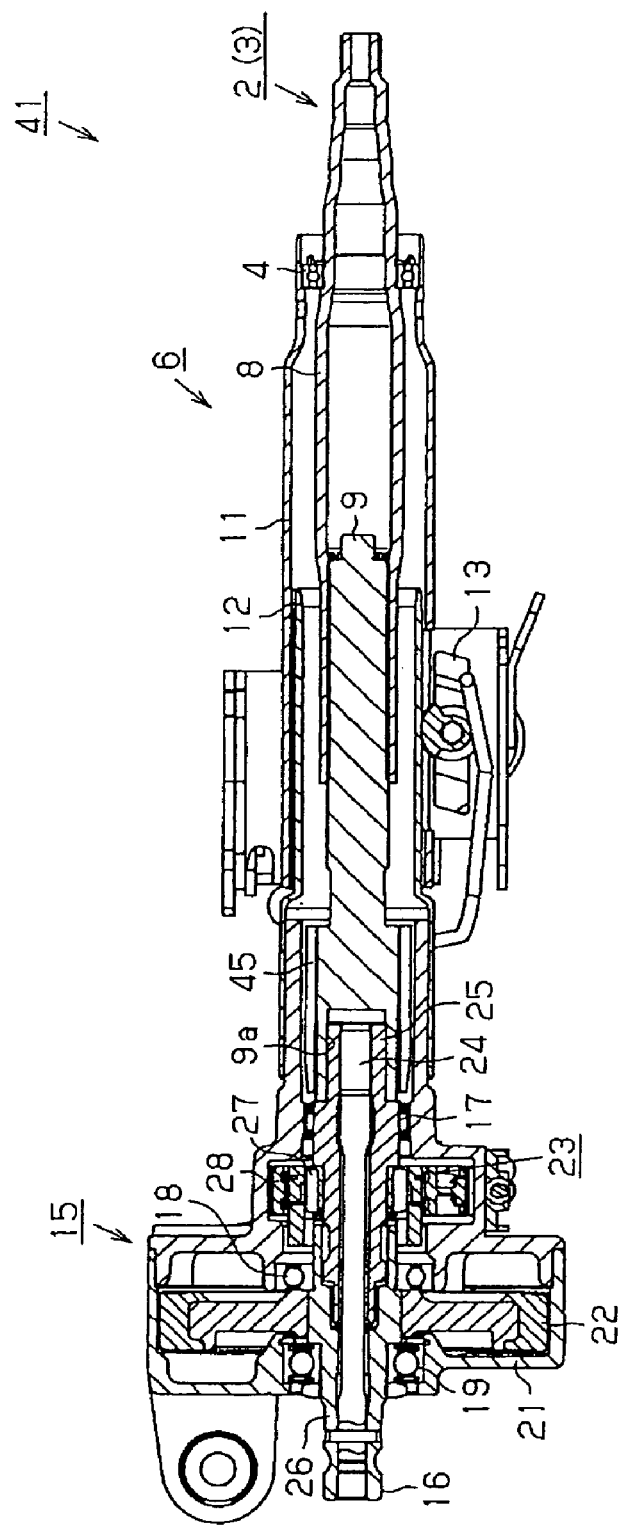
FIG. 3 is a cross-sectional view showing a steering column and portions near the steering column in a steering apparatus according to a second embodiment of the invention.
Figure 4:
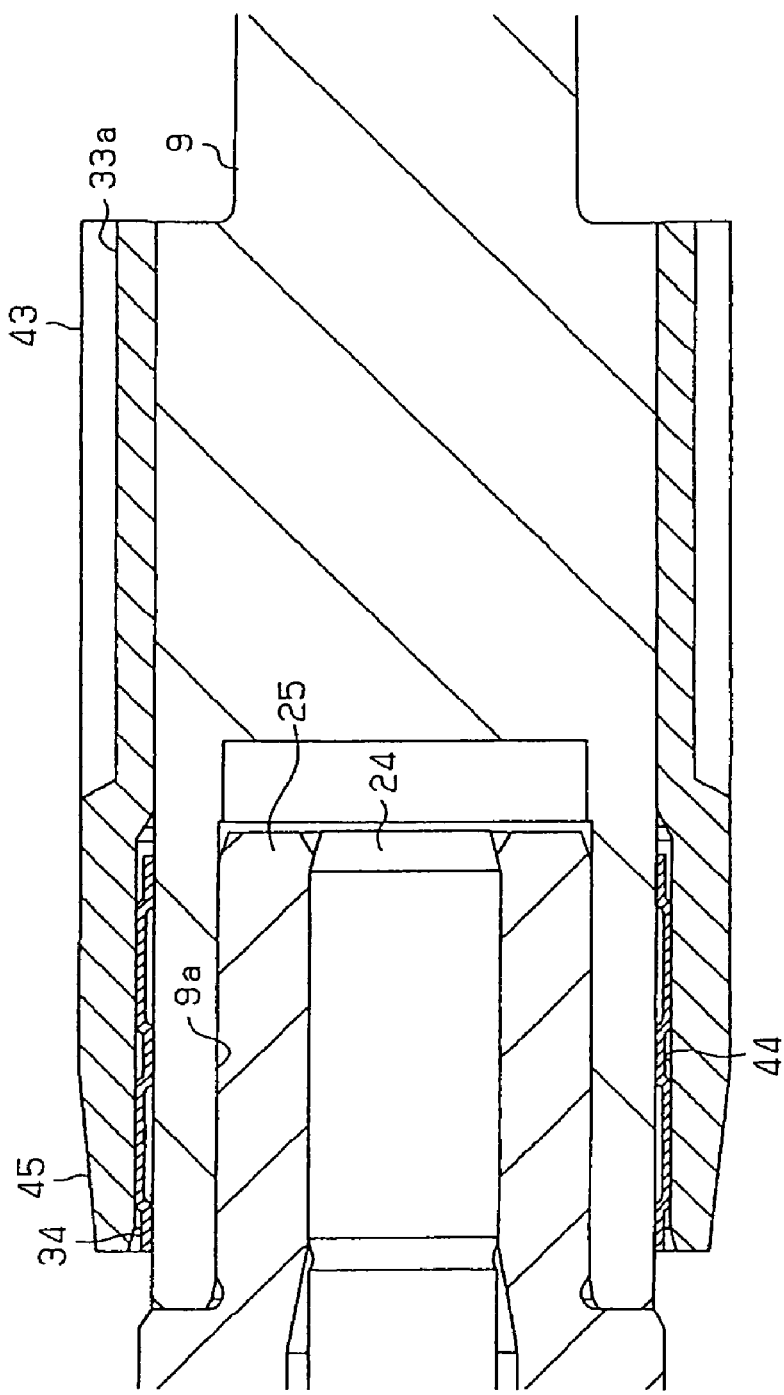
FIG. 4 is an enlarged cross-sectional view showing a key ring and portions near the key ring in FIG. 3.

A second embodiment of the invention will be described with reference to FIG. 3 and FIG. 4. The same components as those in the first embodiments will be denoted by the same reference numerals, and detailed description thereof will not be provided below.

In the first embodiment, in the key ring 31, the lock bar insertion portion 33 is formed in the portion that is on the radially outer side of the press-fit portion at which the key ring 31 is press-fitted onto the steering shaft 2 (column shaft 3). In contrast, according to the second embodiment, in a key ring 45 in a steering apparatus 41 shown in FIG. 3 and FIG. 4, a lock bar insertion portion 43 and a press-fit portion, at which the key ring 45 is press-fitted onto the steering shaft 2 (the column shaft 3) (recess 44 for the tolerance ring 34), are offset from each other in the axial direction. In this case, the key ring 45 is press-fitted onto the steering shaft 2 (column shaft 3) in such a manner that the tolerance ring 34 fitted on the inner periphery of the key ring 45 is on the radially outer side of the portion (spline-fit portion 9a) at which the shaft members (the second shaft 9 and the third shaft 25) that constitute the steering shaft 2 are fitted to each other.

In the second embodiment as well as in the first embodiment, the key ring 45 is press-fitted onto the steering shaft 2 (column shaft 3) at the portion at which the third shaft 25 and the second shaft 9 are connected to each other. However, in the key ring 45 in the second embodiment, the lock bar insertion portion 43 and the press-fit portion, at which the key ring 45 is press-fitted onto the steering shaft 2 (the column shaft 3) (recess 44 for the tolerance ring 34), are offset from each other in the axial direction. Therefore, the thickness of the key ring 45 is reduced in the radial direction. The portion of the steering shaft 2 (column shaft 3) on which the key ring 45 is press-fitted is not limited to the portion described above. The key ring 45 may be press-fitted onto the steering shaft 2 (column shaft 3) at any position of the portion at which the shaft members that constitute the steering shaft 2 are connected to each other by fitting. The portion at which the shaft members are connected to each other need not be the portion at which the torsion bar is fixed to the third shaft.

The invention may be implemented in other embodiments. In the first and second embodiments, the second shaft 9 is hollow only at the spline-fit portion 9a formed at the end portion which is distal to the steering wheel and into which the third shaft 25 is inserted. Alternatively, an axial member that is hollow in the entire axial direction may be used as the second shaft 9.

In the first and second embodiments, the invention is applied to the steering apparatus 1 that is formed as a column-assist electric power steering apparatus (EPS). Alternatively, the invention may be applied to other types of steering apparatuses. The position of the key ring on the steering shaft is not limited to a position on the column shaft.

The number of shaft members that constitute the steering shaft is not particularly limited.

In the first and second embodiments, each of the key rings 31 and 45 is press-fitted onto outer periphery of the column shaft 3 at the portion at which the second shaft 9, the third shaft 25 and the torsion bar 24 are connected to each other. Alternatively, each of the key rings 31 and 45 may be press-fitted onto the outer periphery of the solid shaft member (for example, the second shaft 9).

What is claimed is:

1. A steering apparatus, comprising:
    a lock bar;
    a steering shaft that transmits a steering torque and that is formed by connecting multiple shaft members to each other; and
    a key ring that is press-fitted onto the steering shaft and that has a lock bar insertion portion formed in an outer periphery of the key ring; wherein
    when the lock bar is inserted into the lock bar insertion portion, the key ring restricts rotation of the steering shaft using a friction force that is generated at a press-fit portion that faces the steering shaft,
    when the steering torque that is input in the steering shaft exceeds the friction force, the steering shaft slides with respect to the key ring and the steering shaft is allowed to rotate at a sliding torque that is generated when the steering shaft slides with respect to the key ring and that corresponds to the friction force, and
    the key ring is press-fitted onto the steering shaft at a portion at which the shaft members are fitted to each other and is arranged on a radially outer side of the portion at which the shaft members are fitted to each other.

2. The steering apparatus according to claim 1, wherein the portion of the steering shaft on which the key ring is press-fitted is substantially solid.

3. The steering apparatus according to claim 2, wherein:
    a torsion bar is provided within the steering shaft; and
    the portion of the steering shaft on which the key ring is press-fitted corresponds to a portion of the steering shaft to which the torsion bar is fixed.

4. The steering apparatus according to claim 3, wherein the lock bar insertion portion is formed on the radially outer side of the press-fit portion at which the key ring is press-fitted onto the steering shaft.

5. The steering apparatus according to claim 4, wherein:
    the key ring is press-fitted onto the steering shaft via an annular spring member that generates a pressing force that is applied in the radial direction; and
    a flange is formed on an inner periphery of an end portion of the key ring.

6. The steering apparatus according to claim 5, wherein the spring member includes a base portion, and a bulge portion that is formed on an entire circumference of the base portion and that bulges from the base portion outward in the radial direction.

7. The steering apparatus according to claim 3, wherein the lock bar insertion portion is offset from the press-fit portion at which the key ring is press-fitted onto the steering shaft in an axial direction of the steering shaft.

8. The steering apparatus according to claim 7, wherein:
    the key ring is press-fitted onto the steering shaft via an annular spring member that generates a pressing force that is applied in the radial direction; and
    a flange is formed on an inner periphery of an end portion of the key ring.

9. The steering apparatus according to claim 8, wherein the spring member includes a base portion, and a bulge portion that is formed on an entire circumference of the base portion and that bulges from the base portion outward in the radial direction.

* * * * *